(12) United States Patent
Kießhauer

(10) Patent No.: US 8,773,529 B2
(45) Date of Patent: Jul. 8, 2014

(54) PROJECTOR WITH AUTOMATIC FOCUSING AND ILLUSTRATION PROCEDURE

(75) Inventor: Axel Kießhauer, Reichstädt (DE)

(73) Assignee: Sypro Optics GmbH (DE)

( * ) Notice: Subject to any disclaimer, the term of this patent is extended or adjusted under 35 U.S.C. 154(b) by 397 days.

(21) Appl. No.: 12/794,291

(22) Filed: Jun. 4, 2010

(65) Prior Publication Data

US 2010/0328453 A1  Dec. 30, 2010

(30) Foreign Application Priority Data

Jun. 4, 2009 (DE) .......................... 10 2009 023 868

(51) Int. Cl.
H04N 7/18 (2006.01)

(52) U.S. Cl.
USPC ........... 348/135; 348/136; 348/137; 348/138; 348/139

(58) Field of Classification Search
USPC .................................. 348/135–142, 739–789
See application file for complete search history.

(56) References Cited

U.S. PATENT DOCUMENTS

| | | | | |
|---|---|---|---|---|
| 4,469,416 A | * | 9/1984 | Isono | 351/206 |
| 5,374,954 A | * | 12/1994 | Mowry | 348/121 |
| 5,548,327 A | * | 8/1996 | Gunday et al. | 348/97 |
| 5,625,415 A | * | 4/1997 | Ueno et al. | 348/350 |
| 5,796,425 A | * | 8/1998 | Minami et al. | 348/181 |
| 6,483,555 B1 | * | 11/2002 | Thielemans et al. | 348/745 |
| 7,289,655 B2 | * | 10/2007 | Kitabayashi | 382/141 |
| 7,911,500 B2 | * | 3/2011 | Uchihashi et al. | 348/207.99 |
| 8,072,650 B1 | * | 12/2011 | Starns et al. | 358/447 |
| 8,218,003 B2 | * | 7/2012 | Tan et al. | 348/135 |
| 2004/0066965 A1 | * | 4/2004 | Watanabe et al. | 382/154 |
| 2004/0165154 A1 | * | 8/2004 | Kobori et al. | 353/69 |
| 2005/0001999 A1 | | 1/2005 | Eguchi | |
| 2006/0001836 A1 | * | 1/2006 | Kobori et al. | 353/30 |
| 2007/0242233 A1 | | 10/2007 | Sokeila et al. | |
| 2008/0024738 A1 | | 1/2008 | Nozaki et al. | |
| 2008/0291342 A1 | * | 11/2008 | Hirai | 348/745 |
| 2009/0027570 A1 | * | 1/2009 | Fujinawa | 348/744 |
| 2010/0182416 A1 | * | 7/2010 | Holmgren et al. | 348/77 |

FOREIGN PATENT DOCUMENTS

| | | |
|---|---|---|
| DE | 102005034990 A1 | 9/2006 |
| DE | 602005000296 T2 | 6/2007 |
| JP | 2006184569 A | 7/2006 |
| JP | 2008233551 A * | 10/2008 |

* cited by examiner

Primary Examiner — Christopher S Kelley
Assistant Examiner — Jonathan Messmore
(74) Attorney, Agent, or Firm — Price Heneveld LLP

(57) ABSTRACT

A projector (1) for imaging an original image on a projection area (5) includes projection optics (2) having an adjustable image width (L) for imaging the original image on the projection area (5). A camera device (6) is used for imaging the projection area (5) and generating a projection area image. A comparison device (12) compares the original image with the projection area image and adjusts the image width (L) of the projection optics (2) as a function of the comparison such that the comparison device (12) is configured to determine the position of the original image in the projection area image. The position of the original image in the projection area image is then used as a measure for determining the image width of the projection optics (2).

15 Claims, 4 Drawing Sheets

PROJECTOR WITH AUTOMATIC FOCUSING AND ILLUSTRATION PROCEDURE

CLAIM OF PRIORITY

Applicant hereby claims the priority benefits under the provisions of 35 U.S.C. §119, basing said claim of priority on German Patent Application Serial No. 102009023868.9, filed Jun. 4, 2009.

BACKGROUND OF THE INVENTION

The invention relates to imaging of an original image on a projection area and, more particularly, but not exclusively, to a projector with automatic focusing by way of distance measurement according to the preamble of claim 1 and a corresponding imaging process according to the preamble of claim 12.

Projectors are used to project any type of image onto a surface. The original image can be an optical pattern, for example in form of a slide, or it can be stored in electronic form and transformed by corresponding electrooptic converters into an optical signal. In any event, the image must be represented on the projection area with a predetermined sharpness. This is accomplished by adapting the focus of the projection optics. To be able to adapt the focus, the distance between the projector and the projection area is measured.

A projector with an imaging system is known from US 2005/001999 A1, which enables precise focusing of a projector by using a photo detector. The projector includes an imaging system, with the focusing being performed dependent on the output signal of a photo detector. The photo detector captures the light backreflected from the imaging surface. The optical axis of the imaging system is displaced in relation to a reference axis. The reference axis extends from the center of an original optical image to the center of the projected image. The photo detector captures the light in its capture region proximate to the optical axis, where the position of the optical axis of the optical imaging system on the imaging surface is also located.

The distance is measured by recording the light-dark transition of the lower image edge with a phase comparison sensor. Due to the geometric distance between the two optical axes of the phase comparison sensor, the image edge of each partial unit appears with a different angle depending on the distance. Based on this angle and the width of the base, a triangle is spanned between the optical axes, with the distance being determined by triangulation.

With this state-of-the-art system, a light-dark transition must necessarily exist in the observed region, which is not the case with predominantly dark images or image edge characteristics of the information to be projected that is different from the image aspect ratio of the projector. Additionally, this measurement principle requires a large installation space.

DE 60 2005 000296 T2 discloses a projector with automatic focusing. The projector includes a test structure projection unit for imaging on a projection area a test structure with two regions of different optical density. A focus adjustment unit moves the focal point of the projector, an imaging unit images the projection area, a focus adjustment unit focuses the focal point as a function of an indicator value which is a function of the focusing state.

In other words, by recording the structure with an image recording system, the quality of the actual focus position is measured and the position of the objective is changed until the image shows the best possible "sharpness."

With this conventional approach, a test pattern must disadvantageously be projected which may be objectionable to the user. In addition, the direction of the displacement of the objective is initially not known, so that the image may initially become less sharp.

JP 2006 184569 A1 describes an imaging device with a focusing mechanism. Depending on the output signal of a line sensor, on the distance of the focal point of a coupled range finder lens and on a base length which corresponds to a distance between the optical axis of an imaging lens and the optical axis of the coupled range finder lens, a distance between the imaging reference point of the imaging lens and the point at which the optical imaging axis on a projection area and a projection surface intersect, is computed with a control device by triangulation. Depending on the computed distance, a motor control signal for a motor is generated, which is used to adjust the rotation position of a focusing ring, thereby focusing the imaging lens.

With this system, test patterns based on lines are projected through the projection optics on the projection area. The test image composed of a line can be recorded with a recording objective arranged with an offset and having a line of light-sensitive photo elements as sensors. The distance to the projection area is measured by triangulation. At the same time, trapezoidal distortions which occur when a projection area is arranged at an angle to the optical axis of the projection can be corrected.

DE 10 2005 034 990 A1 discloses a device for auto-focusing with a projector for imaging at least one original image on a projection area with a projection optics having an adjustable focus for imaging the original image on the projection area, and a camera device for imaging the projection area and generating a projection area image, and with a comparison device for comparing the original image with the projection area image and for adjusting the focus of the projection optics depending on this comparison. However, DE 10 2005 034 990 A1 likewise uses a test pattern consisting of bars for performing auto-focusing. In particular, the position of the projected image in the projection area image is not directly used as a measure for adjusting the focus of the projection optics, but rather the overall sharpness of the image test pattern.

US 2007/0242233 A1 discloses a projector and a projection screen, wherein the projection screen has one or more markers for compensating image distortion. US 2007/0242233 A1 also uses a test pattern for performing auto-focusing.

In the aforedescribed state-of-the-art projectors, a test pattern is disadvantageously required for performing focusing, which may be viewed as being annoying in continuous operation.

US 2008/0024738 A1 discloses a projector with integrated camera, wherein the projector lens and the camera lens are controlled by the same drive to reduce the number of components. Although US 2008/0024738 A1 does not employ a test pattern for auto-focusing, but instead the actual images to be projected, auto-focusing is realized by computing the contrast ratio in the projection area image, which disadvantageously increases the required computing complexity.

It is an object of the present invention to obviate the aforementioned disadvantages of the state-of-the-art and, more particularly, to enable precise focusing of the projector without requiring special calibration projections, which may disturb the projection process.

This object is solved by the projector for imaging an original image on a projection area according to claim 1 and the corresponding imaging method according to claim 12. Preferred embodiments of the invention are recited in the respective dependent claims.

The solution of the object according to the invention is based essentially on the determination of a measurement value for automatic focusing. To this end, a camera module is positioned with a lateral offset relative to the optical axis of the projection. The camera module is oriented so as to be capable to record at least a portion of the projection, ideally the entire projection. In addition, a temporary copy of the content to be projected is generated within the projector. By finding the content to be projected in the camera image and determining the lateral position, the distance to the projection area can be determined by triangulation.

The projector according to the invention for imaging an original image on a projection area includes: projection optics with an adjustable focus for imaging the original image onto the projection area and a camera device for imaging the projection area and for producing a projection area image; a comparison device for comparing the original image (i.e., the image data of the image to be projected) with the projection area image; means for adjusting the focus of the projection optics depending on this comparison, wherein the comparison device is configured to determine the position of the original image (i.e., the image data of the image to be projected) in the projection area image, wherein the position of the original image in the projection area image is used as a measure for determining a projection distance corresponding to the distance between the projector and the projection area and thereby to determine the focus of the projection optics.

Preferably, the position of the original image in the projection area image is used as a direct measure for determining a projection distance corresponding to the distance between the projector and the projection area. Preferably, the projection distance is determined by triangulation using the position of the original image in the projection area image.

Preferably, the offset of the image center of the projection of the original image to be projected from the image center of the recorded image (projection area image) in pixels is used as a measure for determining a projection distance corresponding to the distance between the projector and the projection area. Preferably, the projection distance L is determined from this offset by triangulation.

Preferably, the projection distance L is computed as follows:

$$L = \frac{b * R}{k * 2 * \tan(\gamma/2)}$$

wherein b is the distance of the optical axis of the camera from the (parallel) optical axis of the projection optics, γ is the field angle of the camera system, k is the offset of the image center (of the projection) of the original image to be projected in the recorded image from the image center of the recorded image (projection area image) in pixels, R is the resolution of the camera image in the respective direction (preferably in pixels).

To simplify the determination of the image position, the position value k, which represents the offset of the image centers of the projection area image from the image center of the projection in the projection area image, can be transformed into more computationally-friendly values, for example in relation to an offset of an outside edge of the projection area image from the image center of the projection in the projection area image.

Preferred embodiments of the projector according to the invention include as an additional feature or—if the eagerly feasible and advantageous—as combination of additional features, that
- an optoelectronic converter is provided for converting the original image into a photographic pattern for an electronic signal;
- an optoelectronic converter is provided for converting the original image stored as an electronic data set into an optical image;
- a scaling device is provided for matching the size of the original image to the projection image;
- the original image and the projection image each have a predetermined number of horizontal and vertical pixels, and the comparison between original image and projection image is made on a pixel-by-pixel basis;
- the comparison device displaces the original image and the projection area image relative to each other by a predetermined displacement distance and performs for each displacement distance a comparison to determine an optical overlap between the original image and the projection image;
- the displacement distance corresponds to a predetermined number of pixels in the horizontal direction and/or a predetermined number of pixels in the vertical direction;
- to compare the original image with the projection area image, a comparison signal is generated as a function of a brightness difference between the original image and the projection area image;
- to compare the original image with the projection area image, a comparison signal is generated as a function of a color difference between the original image and the projection area image;
- a feature extraction device for extracting at least one image feature from the projection area image is provided, wherein the comparison between original image and projection area image is performed essentially only based on the at least one image feature;
- a temperature sensor for measuring a temperature of the optical components of the projection optics and/or of the camera device and a correction element for correcting the comparison signal as a function of the temperature are provided.

The corresponding imaging method according to the invention for imaging an original image on a projection area with the projector, has the following steps: imaging the original image on the projection area with a projection optics having an adjustable image width and imaging the projection area and generating a projection area image with a camera device, and is characterized by comparing the original image with the projection area image and adjusting the image width of the projection optics with a comparison device as a function of the comparison.

Preferred embodiments of the imaging method according to the invention include as an additional feature or—if technically feasible and advantageous—as a combination of additional features,
- that the original image is converted with an optoelectronic converter from a photographic pattern into an electronic signal, that the original image stored as an electronic data set is converted by an electro-optic converter into an optical signal; matching the size of the original image and of the projection image with a scaling device;
- displacing the original image and the projection area image with respect to one another by a predetermined displacement distance and performing the comparison with the comparison device for each displacement distance so as to determine an optimal overlap between the original image and the projection image;

that the displacement distance corresponds to a predetermined number of pixels in the horizontal direction and/or a predetermined number of pixels in the vertical direction;

that for comparing the original image with the projection area image, a comparison signal is generated as a function of a brightness difference between the original image and the projection area image;

that for comparing the original image was a projection area image, a comparison signal is generated as a function of a color difference between the original image and the projection area image;

extracting at least one image feature from the projection area image with a feature extraction device, wherein the comparison between the original image and the projection area image is essentially performed only based on the at least one image feature;

measuring a temperature of the optical components of the projection optics and/or of the camera device with a temperature sensor, and correcting the comparison signal with a correction element as a function of the temperature.

The solution according to the invention has furthermore the following advantages. Unlike in the state of the art, it is not necessary to superimpose test images which may annoy the viewer. In addition, the distance can be measured and the objective can be specifically moved to the correct position even while projecting unsharp or moving pictures, without the system beginning to "pump."

Additional features and advantages of the invention can be inferred from the following description of particularly preferred embodiments, wherein reference is made to the appended drawing.

BRIEF DESCRIPTION OF THE DRAWINGS

The representation in the Figures is not to scale, and identical elements or elements performing an identical function have identical reference symbols, unless noted otherwise.

DETAILED DESCRIPTION OF THE PREFERRED EMBODIMENTS

Figure 1:
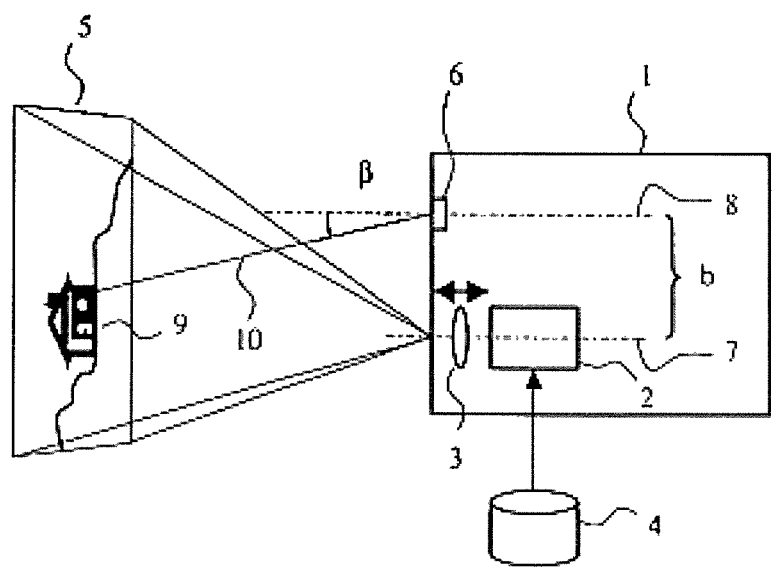
FIG. 1 shows a structure of a conventional projector in a semi-perspective review.

FIG. 1 shows schematically in a semi-perspective view the structure of a conventional projector 1. The projector 1 includes a projection optics 2 having variable focus. The focus can be adjusted with a focusing device 3 for the projection optics, as indicated in FIG. 1 with a double arrow. The image data of the original image to be imaged can, as described in the introduction, be generally present either as optical data, i.e., for example, as a slide or as electronic data. For sake of simplicity, the provided data are presumed to be in electronic form and stored in a memory 4 representing the image source. The electronic image data are loaded from the memory 4 into the projection optics 2, where they are converted by an (unillustrated) electrooptic converter into corresponding optical image information. The image generated in this manner is imaged on a projection area 5.

According to the state-of-the-art projectors, it is known to capture light reflected from the projection area 5 with a camera 6 and to use the reflected light for adjusting the projection optics 2 in the projector 1. A predetermined distance between the camera 6 and the projection optics 2 is provided, which can be used to determine the distance between the projector 1 and the projection area 5 and to focus the projection optics 2. In this way, the projection distance L between projector 1 and projection area 5 can be determined by triangulation. The distance between camera 6 and the projection optics 2 corresponds to a distance "b" between the optical axis 7 of the projection optics 2 and the optical axis 8 of the camera 6.

As already described in the introduction, according to the state-of-the-art projectors, a (unillustrated) test image must be projected on the projection area 5 for determining the projection distance between the projector and the projection area 5 from the known structures in the test image.

Figure 2:
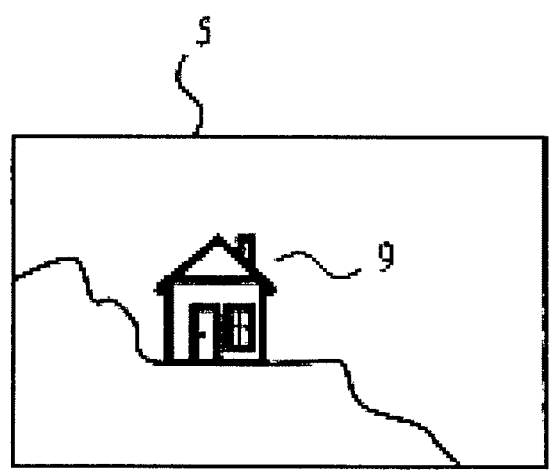
FIG. 2 shows an example of a projected image which can be imaged with the projector of the invention.

FIG. 2 shows an example for a "general" image which can be imaged with the projector on the projection area 5 and which has no limitations with respect to its representation. In the example, a landscape is shown. The image on the projection area 5 is captured by the camera 6 in FIG. 1 under an angle "β", wherein the angle "β" is the angle between a direction 10, from which the image is identified, and the optical axis 8 of the camera 6.

In particular, easily identifiable features 9 can be included for identifying the direction 10, from which the image on the projection area 5 is seen by the camera, and hence the angle "β". In the illustrated example, such feature 9 is represented in the image by a house. This will be described in more detail below.

The basic principle of the invention will now be described with reference to FIG. 3. This basic principle is based on the localization of the projection image (recorded with the camera) in the original image (recorded photographically) by scaling and pixel comparison, for example difference formation.

For measuring the distance between projector 1 and the projection area 5, the position of the projected image in a recorded image, which is recorded by a camera 6 oriented toward the projection area, is required. Unlike with imaging systems used, for example, in industrial counting and sorting facilities, the system of the invention has no limitations with respect to image content. The only prerequisite is that the projection image has non-black image areas in at least some partial regions.

The camera module 6 is arranged next to the projection module 2, so that the optical axes 7, 8 of the two modules are oriented parallel to each other. The projected image is then imaged on the camera sensor essentially without distortion. Moreover, due to approximately identical distance between the projection area 5 and the exit pupil of the projection module 2 and the entrance pupil of the camera module 6, the projected original image is imaged with a constant size on the camera sensor. Thereafter, at least one of the two images, meaning either the projection image or the original image, or both, is then scaled so that at least one partial region of the two images has the same image size in both images. The scaling factor is known from the optical parameters of the projection optics 2 and the camera 6.

If the projector has a resolution of 800×600 pixels, then the camera image is scaled so that the image of the projection in the camera image has also a size of 800×600 pixels. The image positions are determined by superimposing the projection image recorded by the camera and the original image (wherein one or both images may be scaled). The individual pixel values of the two images are then compared with each other and a total value for the comparison is determined.

This process is performed for the two images with several predetermined (horizontal) mutual displacements. Each time, the comparison value is determined. The comparison value may be, for example, the brightness signal summed over all pixels. Alternatively, the color values of each pixel in the two images can be correlated with each other.

Finally, all summed values for the respective displacements are compared with each other, and the optimal overlap of the two images is identified, depending on the underlying correlation algorithm, from the lowest or highest summed value. In this way, a corresponding displacement value is also identified which represents the relative distance (with respect to the distance "b" between the camera and the projection optics) between the projector and the projection area 5 or the angle "β", respectively.

This process operates regardless if the camera is arranged next to or above the exit lens of the projector. When the camera 6 is arranged next to the projection optics 2, the vertical image position remains constant. Conversely, when the camera 6 is arranged above the projection optics 2, the horizontal image position remains constant. This method for superimposing pictures can also be used in measurements where the images have little structure or are unsharp; the only requirement is that an optimal overlap can be determined from the displacement-dependent overlap of the images.

In addition to this general principle, according to a preferred embodiment of the invention, the image captured by the camera 6 is searched to identify a feature. A computing unit capable of finding the projection image in the camera image is required for computing the signals. This is performed with the feature extraction device 11. The two images, and in particular the features identified therein, are then compared with each other in a comparison device 12, and a corresponding comparison signal is generated. This comparison signal is subsequently supplied to the focusing device 3 which is adjusted depending on the comparison signal, so that the image on the projection area 5 has an optimal effect on the viewer.

Figure 3:
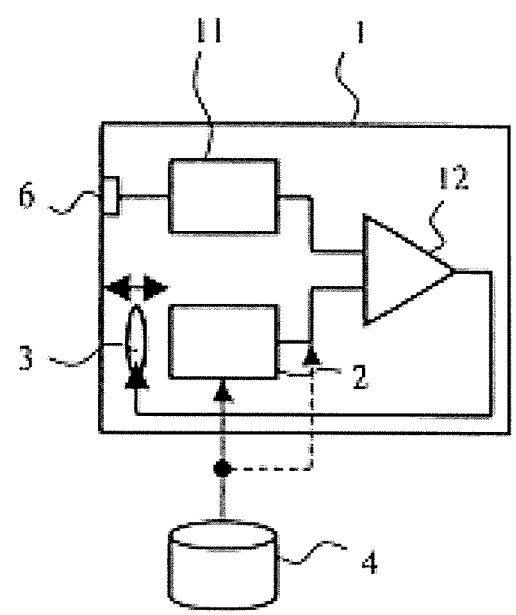
FIG. 3 shows schematically an embodiment of the projector according to the invention in form of a block diagram.

One embodiment of this method is shown in FIG. 3. The projector 1 in FIG. 3 is, like in FIG. 1, a projector which receives the contents of the image to be projected—unlike slide projectors—from the image memory 4 in form of electrical signals. The camera 6 captures the image projected on the projection area 5 electronically and stores it as projection image.

As shown in FIG. 3, the original image is present at an output of the projection optics 2, from where it is supplied to an input of the comparison device 12. It will be understood that alternatively the input signal of the comparison device 12 may also be supplied directly from the image memory 4. This is indicated in FIG. 3 by the dashed branch.

A search is performed for a partial region where a feature of the image can be identified. The comparison between the two images from the image memory 4 and from the camera 6 is then limited to the partial region around the identified feature. Subsequently, the same procedure already described above is performed. Based on the feature 9 identified in the image on the projection area 5, an even more accurate direction 10 from the camera 6 and hence an even more accurate angle "β" can be determined. The required projection distance between the projector 1 and the projection area 5 can be determined therefrom and from the distance "b" between the camera 6 and the optics 2, as described above.

A skilled artisan will appreciate that the invention is not limited only to the principle, but that various modifications are possible, of which some will now be described.

Instead of loading the original image from a data carrier and converting it into an optical signal with an electro-optic converter in the projection optics, the original image can also be converted into an electronic form from a photographic pattern via an optoelectronic converter.

The feature extraction device 11 which evaluates the electronic image from the camera 6 is particularly suited to discriminate brightness differences and color differences in the projection area image. It will be understood that the measurement results are dependent if the camera module has its own focusing and how high the resolution is. If the resolution is high enough, then not only the house as a whole can be resolved in the example illustrated in FIG. 2, but for example also the chimney or the door of the house can be used as reference point for the triangulation.

Temperature-related drift is a problem frequently encountered with optical devices having higher or very high resolution. This effect can be neutralized by preferably providing a temperature sensor which measures the temperature of the optical components of the projection optics 2 and/or the camera 6. The actual temperature value can then be used in an (unillustrated) correction element to correct the comparison signal as a function of temperature. Preferably, the actual state of the projection objective is included in the distance calculation if the projection angle depends therefrom.

Figure 4:
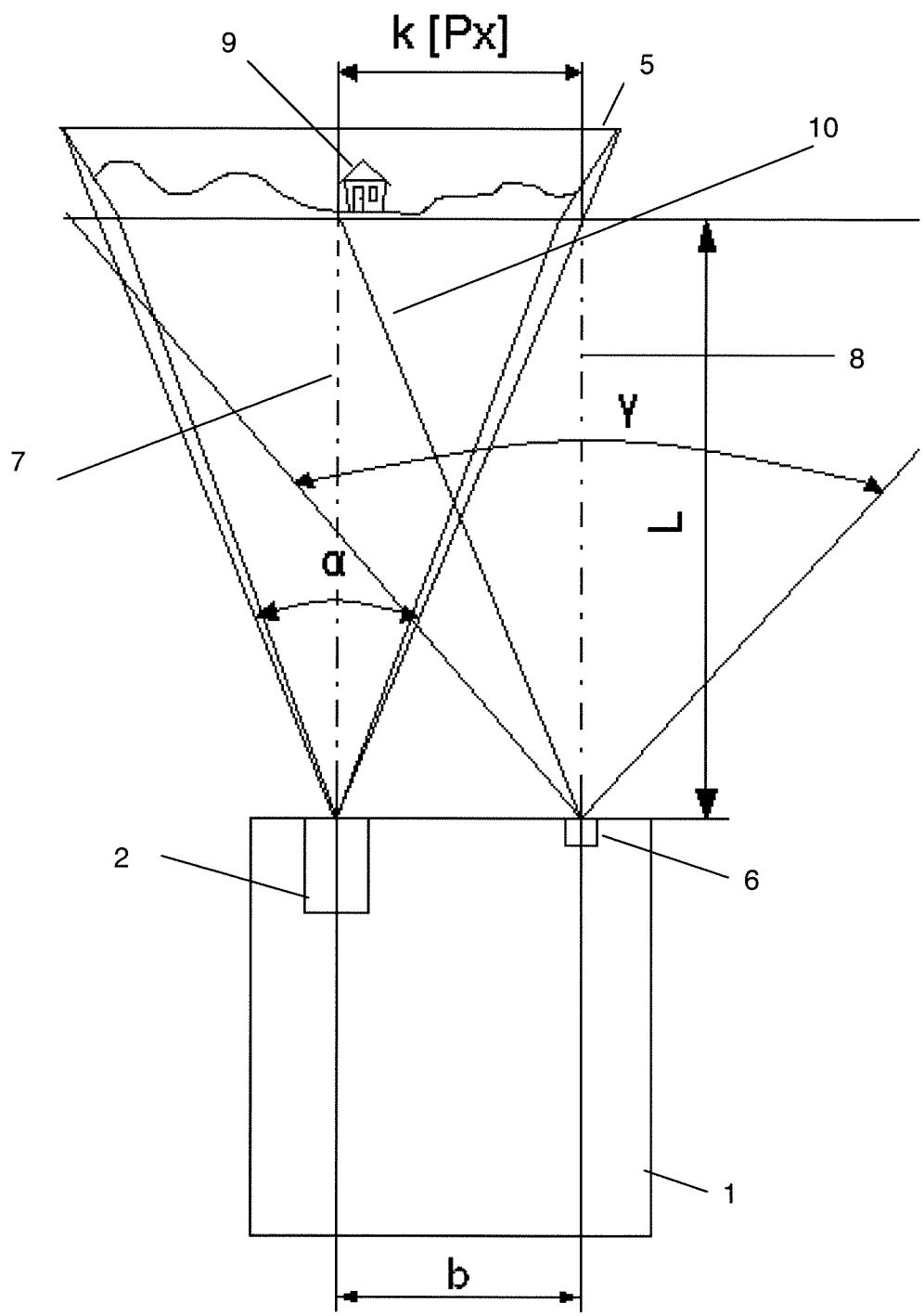
FIG. 4 shows schematically an embodiment of the projector according to the invention and the parameters relevant for determining the focus.
Figure 5:
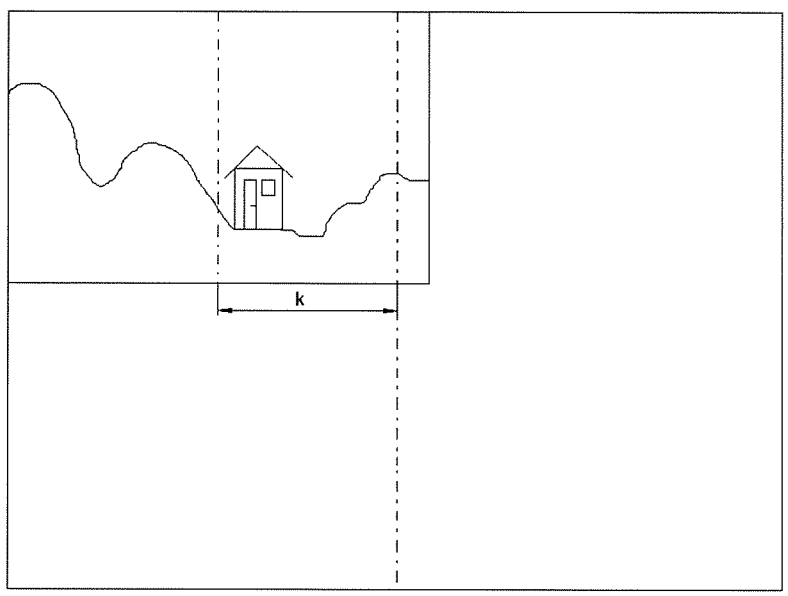
FIG. 5 shows schematically the position of the original image in the projection area image as a measure for determining the focus of the projection optics.

FIGS. 4 and 5 shows schematically an embodiment of the projector of the invention and the parameters relevant for determining the focus.

The problem associated with attaining the measurement value for automatic focusing of the projector 1 or the projection optics 2 is solved by positioning a camera module (or a camera device) 6 with a lateral offset b from the optical axis 7 of the projection optics 2. The camera module 6 is oriented so as to be able to capture at least a portion of the projection, ideally the entire projection, meaning the image projected by the projection optics 2 onto the projection area 5. Moreover, a temporary copy of the contents to be projected is generated inside the projector 1. By finding the image to be projected in the camera image (=projection area image)—as illustrated in FIG. 5—and by determining the lateral offset k, the projection distance L to the projection area 5 can be determined by triangulation.

Unlike in the state of the art, it is not necessary, on one hand, to superimpose test images which may annoy the user. On the other hand, a camera system is employed which is more compact compared that disclosed in DE 602005296 T2 and requires less installation space. In addition, the projection distance L can be measured even while projecting unsharp or moving images and the objective 2 can be moved specifically to the correct position, without the system beginning to "pump."

For solving the problem, a projector 1 is required which, unlike slide projectors, receives the contents of the image to be projected in form of electrical signals. In addition, a camera module 6 is required which also generates an electronic image (projection area image). For computing the signals, a computing unit is required which can find the projection image in the camera image (meaning the projection area image).

For a measurement with the triangulation principle, a lateral distance between the projection optics 2 and the camera module 6 is required. A projection image is also required which has non-black image regions at least in certain partial areas.

Advantageously, the actual state of the projection objective can be incorporated in the distance calculation, if the field angle of the projection depends therefrom. Furthermore, a temperature sensor can measure the temperature of the optical components, if temperature affects the projection and image capture.

The measurement results can also be improved if the camera module 6 has dedicated focusing and a relatively high resolution.

The projection distance L can be computed as follows:

$$L = \frac{b*R}{k*2*\tan(\gamma/2)}$$

wherein b is the distance between the optical axes 7 and 8, γ is the field angle of the camera system 6, k is the offset of the image center of the original image to be projected in the projection area from the image center of the projection area image (in pixels—see FIG. 5), and R is the resolution of the projection area image 6 in the respective direction (here in pixels). All of b, α, k and R must extend in the same direction, either horizontally (as illustrated in FIGS. 4 and 5) or vertically.

To simplify to determination of the image position, the position value k, which represents the offset of the image center of the projection area image from the image center of the projection in the projection area image, can be transformed into more computationally-friendly values, for example an offset of an outside edge of the projection area image from the image center of the projection of the projection area image.

If the camera image 6 is scaled for finding the image, wherein for example the projected image can retain its original resolution, then the camera resolution R obtained after scaling must be inserted in the formula for computing the focus.

Advantageously, both images are scaled for determining the image position, so that the projected image has the same image size in pixels as the projected image in the camera image.

This is realized with the following condition:

$$\frac{2*\tan(\gamma/2)}{R} = \frac{2*\tan(\alpha/2)}{R_P}$$

wherein α is the field angle of the projection and $R_p$ is the resolution of the projection in the respective direction (here in pixels).

A skilled artisan will appreciate that a camera system which is more compact than conventional systems requires less installation space.

In the foregoing description, it will be readily appreciated by those skilled in the art that modifications may be made to the invention without departing from the concepts disclosed herein. Such modifications are to be considered as included in the following claims, unless these claims by their language expressly state otherwise.

| | List of references symbols |
|---|---|
| 1 | Projector |
| 2 | Projection optics |
| 3 | Focusing device |
| 4 | Memory |
| 5 | Projection area |
| 6 | Camera/camera device/camera module |
| 7 | Optical axis of the projection optics |
| 8 | Optical axis of the camera |
| 9 | Image feature (house) |
| 10 | Direction in which the image feature is located with respect to the optical axis of the camera |
| 11 | Feature extraction device |
| 12 | Comparison device |
| K | Offset of the image center of the image to be projected in the projection area image from the image center of the projection area image (in pixels) |
| B | Distance between the two optical axes |
| R | Resolution of the camera image |
| $R_p$ | Resolution of the projection in the respective direction |
| α | Field angle of the projection |
| β | Angle of the image feature relative to the optical axis of the camera |
| γ | Field angle of the camera system |
| L | Projection distance from which the focus of the projection optics may be determined |

The invention claimed is:

1. A projector for imaging an original image on a projection area comprising:

projection optics having an adjustable focus for receiving the original image and projecting an image of the original image to provide a projected image on the projection area;

a camera device for imaging the projection area and generating a projection area image;

a comparison device for comparing the original image as provided to the projection optics with the projection area image and adjusting the focus of the projection optics as a function of the comparison such that the comparison device is configured to determine the position of the projected image of the original image in the projection area image; and wherein the position of the projected image of the original image in the projection area image is used as a measure for determining a projection distance corresponding to a distance between the projector and the projection area and thereby adjusting the focus of the projection optics.

2. A projector for imaging an original image on a projection area comprising:

projection optics having an adjustable focus for projecting the original image on the projection area;

a camera device for imaging the projection area and generating a projection area image;

a comparison device for comparing the original image with the projection area image and adjusting the focus of the projection optics as a function of the comparison such that the comparison device is configured to determine the position of the original image in the projection area image; and wherein the position of the original image in the projection area image is used as a measure for determining a projection distance corresponding to a distance between the projector and the projection area and thereby adjusting the focus of the projection optics, wherein the projection distance (L) is determined according to the equation:

$$L = \frac{b*R}{k*2*\tan(\gamma/2)}$$

wherein b is a distance of an optical axis of the camera device from an optical axis of the projection optics, γ is a field angle of the camera device, k is an offset of an image center of the original image to be projected in the projection area from an image center of the projection area image, and R is for a resolution of the projection area image generated by the camera device.

3. A projector as in claim 1, further comprising:
an optoelectric converter for converting the original image stored as an electronic data set into an optical image or for converting the original image from a photographic pattern into an electronic signal.

4. A projector as in claim 1, wherein a comparison signal is generated depending upon a difference between the original image and the projection area image.

5. A method for imaging an original image on a projection area with a projector comprising the steps of:
projecting an image of the original image on the projection area with projection optics having an adjustable focus;
imaging the projection area and generating a projection area image with a camera device;
comparing the original image with the projection area image using a comparison device that generates a comparison signal;
adjusting the focus of the projection optics as a function of the comparison signal, such that the comparison device is configured to determine the position of the projected image of the original image in the projection area image; and
using the position of the projected image of the original image in the projection area image as a measure for determining a projection distance corresponding to a distance between the projector and the projection area and thereby adjusting the focus of the projection optics.

6. A method for imaging an original image on a projection area with a projector comprising the steps of:
projecting the original image on the projection area with projection optics having an adjustable focus;
imaging the projection area and generating a projection area image with a camera device;
comparing the original image with the projection area image using a comparison device that generates a comparison signal;
adjusting the focus of the projection optics as a function of the comparison signal, such that the comparison device is configured to determine the position of the original image in the projection area image;
using the position of the original image in the projection area image as a measure for determining a projection distance corresponding to a distance between the projector and the projection area and thereby adjusting the focus of the projection optics;
determining the projection distance (L) using the following equation:

$$L = \frac{b*R}{k*2*\tan(\gamma/2)}$$

wherein b is a distance of an optical axis of the camera device from an optical axis of the projection optics, γ is a field angle of the camera device, k is an offset of an image center of the original image to be projected in the projection area from an image center of the projection area image, and R is a resolution of the projection area image generated by the camera device.

7. A method for imaging as in claim 5, further comprising the step of:
converting the original image stored as an electronic data set into an optical image with an electrooptic converter.

8. A method for imaging as in claim 5, further comprising the step of:
converting the original image from a photographic pattern into an electronic signal with an optoelectronic converter.

9. A method for imaging as in claim 5, further comprising the step of:
matching a size of the original image and the projection image with a scaling device.

10. A method for imaging as in claim 5, further comprising the steps of:
displacing the original image and the projection area image with respect to each other by a predetermined displacement distance; and
comparing the original image with the projection area image for each displacement distance with the comparison device in order to determine an optimal overlap between the original image and the projection image.

11. A method for imaging as in claim 5, further comprising the steps of:
providing a temperature sensor for measuring a temperature of the optical components of the projection optics or of the camera device; and
providing a correction element for correcting the comparison signal as a function of the temperature.

12. A method for imaging as in claim 5, wherein the comparison signal is generated based upon on a brightness difference between the original image and the projection surface image.

13. A method for imaging as in claim 5, wherein the comparison signal is generated based upon a color difference between the original image and the projection surface image.

14. An imaging method as in claim 5, further comprising the steps of:
extracting at least one image feature from the projection area image with a feature extraction device;
wherein the comparison between the original image and the projection area image substantially based on the at least one image feature.

15. An imaging method as in claim 12, further comprising the steps of:
measuring a temperature of the optical components of the projection optics and the camera device with a temperature sensor; and
correcting the comparison signal as a function of the temperature with a correction element.

* * * * *

UNITED STATES PATENT AND TRADEMARK OFFICE
CERTIFICATE OF CORRECTION

PATENT NO.        : 8,773,529 B2
APPLICATION NO.   : 12/794291
DATED             : July 8, 2014
INVENTOR(S)       : Axel Kießhauer Page 1 of 1

It is certified that error appears in the above-identified patent and that said Letters Patent is hereby corrected as shown below:

In the Claims

Column 12, line 52, after "image" insert --is--.

Signed and Sealed this
Third Day of March, 2015

Michelle K. Lee
*Deputy Director of the United States Patent and Trademark Office*